July 19, 1960 F. T. TAKENAKA ET AL 2,945,268
LAMINATED ASSEMBLY
Filed March 12, 1956 2 Sheets-Sheet 1

INVENTORS
FRED T. TAKENAKA and
OSCAR D. ENGLEHART
BY
Oscar H. Spencer
ATTORNEY

July 19, 1960   F. T. TAKENAKA ET AL   2,945,268
LAMINATED ASSEMBLY

Filed March 12, 1956   2 Sheets-Sheet 2

Inventors
FRED T. TAKENAKA and
OSCAR D. ENGLEHART

Oscar L. Spencer
Attorney

United States Patent Office 2,945,268
Patented July 19, 1960

2,945,268

LAMINATED ASSEMBLY

Fred T. Takenaka, Saxonburg, and Oscar D. Englehart, Brackenridge, Pa., assignors to Pittsburgh Plate Glass Company, Allegheny County, Pa., a corporation of Pennsylvania Filed Mar. 12, 1956, Ser. No. 570,971

11 Claims. (Cl. 20—56.4)

This invention relates to an improved laminated glass-plastic assembly which comprises two matched sheets of curved glass and a thermoplastic interlayer. The invention especially relates to an improved apparatus susceptible of being laminated by the methods and apparatus disclosed in copending patent applications of Lawrence A. Keim, Serial No. 529,404, filed August 19, 1955, the disclosure of which is incorporated herein by reference. The present invention also relates to an improved method of preparing laminated glass assembly for insertion within an automobile frame wherein a special frame member is useful in laminating the assembly and also forms part of the laminated assembly to be inserted in the automobile frame.

In the copending Keim application referred to above, an improved method of prepressing is disclosed. In this method, the periphery only of an assembly comprising a pair of glass sheets and a thermoplastic interlayer is enclosed within a channel member of a fluid impervious material. The channel member includes flanges engaging the outer surfaces of a narrow marginal area of the assembly to seal the latter. This impervious material is spaced from the periphery of the assembly so that the channel provides a conduit which is evacuated to remove air from between the interlayer and the glass sheets. A passage is provided for connecting an evacuation device to the conduit. The entire assembly is then heated with the fluid impervious material peripherally maintained on the assembly. The heating is carried out at an elevated temperature sufficient to seal at least the marginal area of the laminated assembly. The prepressed assembly is then ready for final pressing in an autoclave.

The present invention provides a development made possible by the invention disclosed and claimed in the above-identified earlier filed copending application. This development is characterized in one embodiment by an improved channel member constructed so that it contains a pair of spaced channels coextensive with the frame member, each channel comprising spaced opposed flanges. One of the channels is mounted to encompass the periphery of the assembly so that its flanges overlap the outer surfaces of the glass sheets at their margins only. A closable passage is connected to said encompassing channel for evacuation of the conduit formed when the frame member is mounted about the periphery of the assembly. The other channel is so oriented that its flanges encompass the flange of an automobile frame to which the laminated assembly is to be mounted.

The frame member modified according to our invention may be used in prepressing or laminating glass-plastic assemblies according to the Keim invention. Before our invention, it was taken for granted to remove the frame member after the lamination or pressing was completed. Instead, the present invention requires that the frame member remain in situ about the assembly as a cushion which protects the edges of the latter during shipment from the assembly fabrication plant to an automobile assembly plant where the laminated assembly is mounted as a windshield into an automobile frame. Furthermore, according to a particular embodiment of our invention, the same frame member used during the laminating process is used to mount the assembly within an automotive frame.

A principal object of the present invention is to provide an improvement in the method for laminating or pressing a laminated glass-plastic assembly in which a part of the apparatus utilized in the method is also utilized to protect the edges of the assembly and which part forms at least part of the framing member for mounting the laminated assembly as a windshield in an automobile.

Another object of the present invention is to provide an improved laminated glass-plastic assembly comprising an improved frame member.

Another object of the present invention is to provide an improved laminated glass-plastic assembly having an improved frame member including a pair of spaced channels coextensive therewith, one of whose channels encompasses the periphery of the assembly and is connected to a closable evacuation port and whose other channel is adapted for engagement with a portion of the frame into which the laminated assembly is to be mounted.

Still another object of the present invention is to provide an improved frame member for a laminated glass-plastic assembly.

These and other objects of the present invention will be apparent to one skilled in the art from the description of particular embodiments which follows. In the drawings which form part of the present description of these embodiments:

Figure 1:
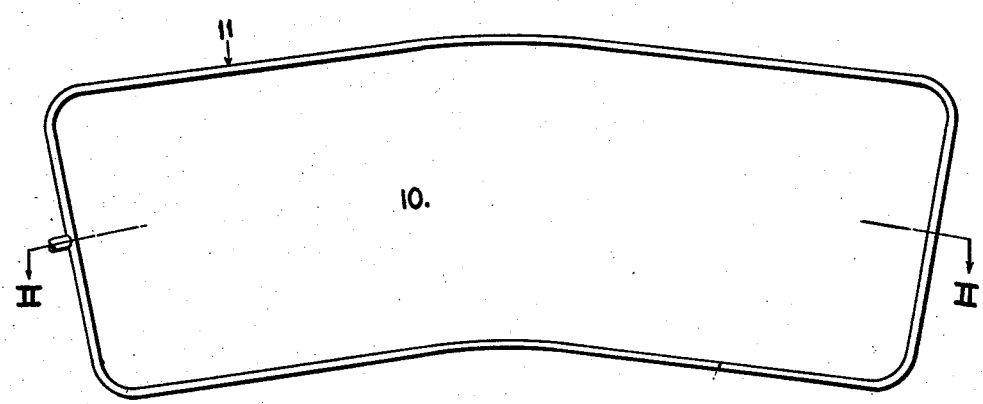
Figure 1 is a top plan view of apparatus according to the present invention, and shows a curved laminated glass-plastic assembly about which is mounted an improved frame member preparatory to pressing or laminating.

A typical apparatus for preparing a laminated glass-plastic assembly, generally indicated at 10, for laminating and insertion into a windshield, includes a frame member shown generally at 11. The assembly 10 includes a pair of glass sheets 12 and 14 and a thermoplastic interlayer 16.

The frame member 11 comprises a channel 18 extending completely about the periphery of assembly 10 and defined by a web portion 20 and flanges 22 and 24. A quick closing passage 26 communicates with the channel 18. Passage 26 is adapted to be spread open to receive a pipe 28 which is connected to a vacuum exhaust apparatus (not shown).

The channel member 11 is preferably made of a flexible material impervious to fluids such as rubber or a synthetic plastic such as dimethyl polysiloxane. Other materials having a high elasticity and resistance to autoclave temperatures and pressures are especially desirable for the channel members 11. Vulcanized copolymers of isobutylene containing small amounts of diolefins, known generically as butyl rubbers, have been found to be especially suitable for the channel members because of their adhesion to glass, high elasticity and impermeability to fluids. Thus when pipe 28 is removed from the passage 26 the flexibility of the material forming the channel member 11 causes passage 26 to close, thereby sealing a vacuum chamber about the periphery of the assembly 10. Passage 26 may also be closed by applying an external closing force such as pinching the tube 28, which will be described in greater detail later.

Channel member 11 contains an additional channel 30 extending peripherally thereabout and spaced from channel 18. The latter channel receives flange 32 of the windshield frame 33. A flexible lip 34 is mounted behind the windshield flange 32. The inner garnish molding 35 of the windshield panel is secured to the frame 33 by a screw 36 in such a manner that the lip 34 is held rigidly against the interior surface of flange 32. An additional channel 37 may be provided to open to the outer surface of the assembly to receive the outer chrome trim molding 38 typical of an automobile windshield.

It has been found advisable to coat the flanges 22 and 24 with a sealing compound after mounting on the assembly prior to prepressing or lamination. A suitable sealing compound was found to be a 5 percent solution of polyvinyl alcohol in water for channel members formed of oil resistant rubber having a Shore durometer hardness of 50 to 55 in one formulation and 60 to 65 in another formulation. This solution contained a medium viscosity polyvinyl alcohol (Elvanol 54–22) which has a viscosity, as a 4 percent solution in water, of 20 to 30 centipoises at 20° C.

Tube 28 is formed of a soft metal. Aluminum and copper are preferred. When evacuation of the peripheral chamber 18 is completed, the soft small diameter copper tubing may be pinched off. A commercially available tool is used for such pinching. This tool provides means for cutting off the vacuum source and at the same time provides a sealed end for the outer portion of the copper tube 28.

The channel-shaped member 11 is not limited to a single preformed member such as disclosed. For example, a porous elastic tape can be mounted around the periphery of the assembly 10 in contact with the interlayer 16 and than a plastic putty material can be hand shaped to cover the entire periphery including the elastic tape with the plastic putty covering at least a marginal portion of the surfaces of assembly 10. A tube 28 connected to a source of vacuum is pushed through the plastic putty into contact with the elastic tape to cooperate with the tape to provide an air passage to the periphery of the assembly. Such air passage is necessary for the prepressing or laminating operation. A typical plastic putty suitable for this purpose is a polyalkylene, polysulfide material, "Thiokol," which can be improved in its properties for this purpose by the addition of carbon black. This construction with a plastic putty bordering around the assembly is left in situ for the autoclave operation if the latter is needed. When the assembly is mounted within a windshield frame, the putty can be deformed sufficiently to be engaged by the windshield flange 32.

Figure 2:
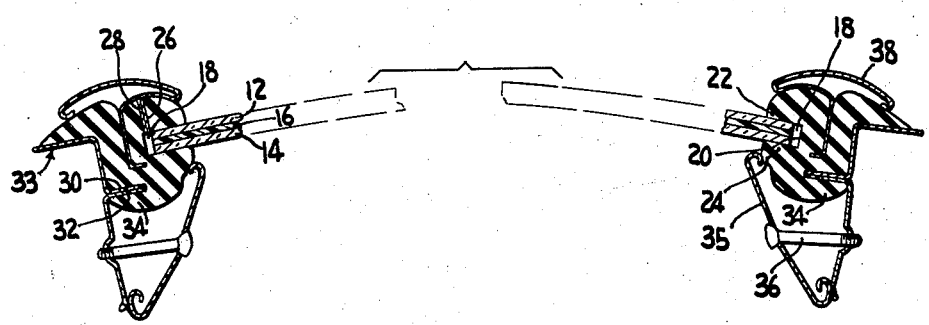
Figure 2 is a fragmentary cross section of Figure 1 taken along the line II—II, showing the completed assembly mounted in a windshield.
Figure 3:
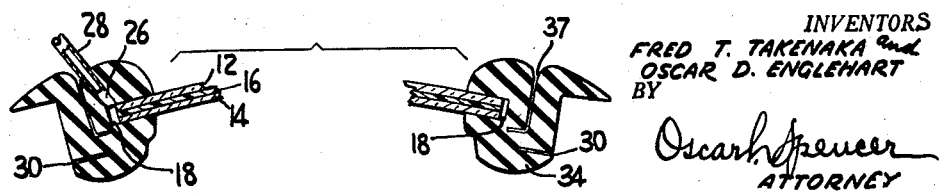
Figure 3 is a fragmentary cross section of an assembly similar to Figure 2, but showing the assembly prepared for pressing or lamination.

The particular windshield construction shown in Figures 2 and 3 are for the 1955 Ford and Mercury one-piece wrap-around windshields. It is understood, however, that these principles may be applied to other windshield designs.

The principles of the present invention can be followed even if the frame member 11 does not have a plurality of peripherally extending channels spaced from each other. The various frame members disclosed in the Keim and Englehart applications may be left in situ about the periphery of the laminated assembly and shipped to the customer in such a manner. The conventional mold trim frame may then be mounted about the periphery of the assembly including the frame member when the assembly is mounted in an automobile.

Figure 4:
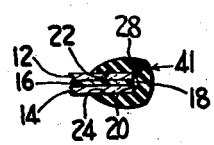
Figure 4 is a fragmentary sectional view of a portion of a frame member mounted on an assembly for laminating or prepressing.
Figure 5:
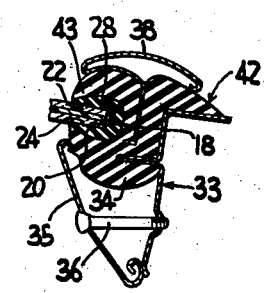
Figure 5 is a view similar to Figure 4, showing how the section of the laminated assembly with the frame member in situ may be mounted within a conventional windshield weather strip.
Figure 6:
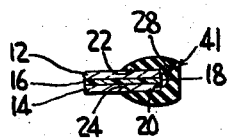
Figures 6 and 7 are views similar to Figures 4 and 5, respectively, showing an alternate embodiment of the frame member.
Figure 7:
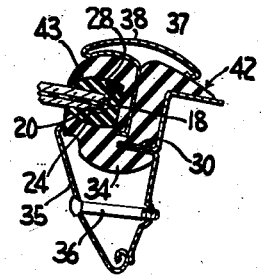

Thus, as seen in Figures 4 through 7, it is possible to utilize a channel-shaped member 41 having a single channel 18 extending completely about the periphery of the assembly and defined by a web portion 20, flanges 22 and 24 and quick closing passage 26. The web portions 20 are shaped so that their surfaces opposing the assembly edge are hollowed out to insure that channel 18 is continuous. In Figures 4 and 5, the hollow is shown as V-shaped in cross-section, while in Figures 6 and 7, the concavity is U-shaped in section. After the assembly is laminated, the entire assembly containing the channel-shaped member 41 in situ is encompassed within a conventional automotive weather strip 42, which is provided with a channel member engaging portion 43 encompassing channel member 41 and an additional channel member 30 which encompasses the windshield frame 33.

The following procedure is recommended in mounting a windshield within the windshield frame. Similar precautions should be observed while mounting a windshield provided with a frame member 41 encompassed by a conventional weather strip 42 or mounting a channel member 11 combining the features of the frame member used for laminating or prepressing and those of a conventional weather strip, such as depicted in Figures 1 through 3.

First of all, the frame member (either the unitary structure 11 or a combination structure 41, 42) should be cleaned before mounting. The windshield flange 32 should be inspected for kinks, burrs and rough and uneven edges. A layer of cellulose tape has been found to aid sealing if placed on the flange 32 around rough and uneven edges. The inner garnish molding 35 is removed by unscrewing the screw 36 engaging the inner garnish molding to the windshield. Windshield wiper arms and the rear view mirror should be removed. Different sized screws are utilized to attach the different articles to the automobile frame. Noting the size of the various screws as they are removed helps to replace them properly after the windshield is mounted.

A strong cord is installed completely around the inner lip 34 of the channel member or weather strip. The ends of the string are overlapped at the top center of the windshield unit. Liquid soap should be brushed onto the weather strip 42 or the portion of the unitary channel member 11 to engage the windshield flange 32. A bead of suitable adhesive is placed around the outside of the windshield flange 32. The assembly is then set into the windshield opening from outside the car. The windshield is positioned in the opening properly and pressed firmly with the hands against the windshield flanges.

A helper is recommended at this point so that one man can press the glass from the outside while the other man pulls the cord from the inside. The cord should be started from the top center and pulled gently around the top corners. The inner garnish molding 35 is then screwed onto the windshield frame by screwing the screws 36. The rear view mirror and the windshield wiper arms are then replaced.

The following benefits are derived by enclosing the laminated assembly within the channel frame member. First of all, the individual glass sheets need not be seamed to improve their edge strength, because the channel members 11 provide sufficient cushioning to prevent any edge chipping that would result if the edges were exposed. Furthermore, there is no necessity for conforming misaligned edges by seaming the extending portion in the event the edges do not coincide after lamination, because the non-registration of the glass sheet peripheries is hidden by the frame member 11 or 41. Furthermore, other defects such as "pie crust" or waviness at the edge of the glass resulting from defective bending operations or minor edge chipping which would normally result in visible rejects become acceptable since these rejects are hidden within the peripheral frame member. Furthermore, the presence of a frame member about the edge of the assembly inhibits moisture penetration, a factor that is detrimental to the laminate.

The particular embodiments described above are for purposes of illustration rather than limitation. Reference to the latter may be had from the accompanying claims.

What is claimed is:

1. A laminated glass-plastic assembly comprising a pair of matched glass sheets, a thermoplastic interlayer between said pair of matched glass sheets, a frame member having a pair of spaced channels coextensive longitudinally therewith, each channel comprising spaced opposed flanges, said frame member mounted about the periphery of said assembly so that one of said pair of channels encompasses the peripheral edge of the assembly in spaced relation thereto and its flanges overlap the outer surfaces of the glass sheets at their margins only to provide an encompassing channel about said assembly and a closable passage connected to said one encompassing channel and extending therefrom laterally of the frame member to its surface out of communication with said second channel.

2. The assembly according to claim 1, wherein said closable passage contains a soft metal tube.

3. The assembly according to claim 2, wherein said soft metal tube is pinched closed to inhibit the passage of fluid into said channel.

4. The assembly according to claim 1, wherein an adhesive is placed between the flanges of the channel member and the overlapped surface portions of the glass sheets.

5. The assembly according to claim 1, wherein the glass sheets are curved to complex curvatures.

6. The assembly according to claim 1, wherein said assembly comprises a pair of elongated glass sheets that are curved along their longitudinal and along their transverse axes.

7. A frame member for a laminated glass-plastic assembly comprising an endless channel member having a pair of spaced channels coextensive therewith, each channel comprising spaced, opposed flanges, and a passage connected to one of said spaced channels and extending outwardly therefrom to its surface out of communication with said second channel, said one channel adapted to encompass the entire perimeter of the assembly in spaced relation to at least a portion thereof.

8. The frame member according to claim 7, wherein the passage contains a soft metal tube.

9. The frame member according to claim 8, wherein the soft metal tube is pinched closed.

10. A laminated glass-plastic assembly comprising a pair of glass sheets, a thermoplastic interlayer between the sheets to provide a spaced pair of glass-plastic interfaces, a frame member including a first channel comprising opposed flanges and a web member interconnecting the flanges in spaced relation to the margin of the glass sheets and the plastic interlayer, said first channel having a width exceeding that of the plastic interlayer thickness and positioned in alignment with both interfaces, a passage communicating with said channel and extending therefrom, and a second channel spaced from said first channel.

11. The assembly according to claim 10, wherein the flanges encompass the outer surfaces of the glass sheets so that the width of the first channel substantially equals the combined thickness of the glass sheets and plastic interlayer.

References Cited in the file of this patent

UNITED STATES PATENTS

| | | |
|---|---|---|
| 237,860 | Guipet | Feb. 15, 1881 |
| 364,434 | Pitmon | June 7, 1887 |
| 1,461,079 | Beitman | July 10, 1923 |
| 2,204,769 | Potter | June 18, 1940 |
| 2,389,360 | Guyer et al. | Nov. 20, 1945 |
| 2,736,404 | Clingman | Feb. 28, 1956 |